US 6,610,957 B2

(12) United States Patent
Uttrachi

(10) Patent No.: US 6,610,957 B2
(45) Date of Patent: Aug. 26, 2003

(54) WELDING SHIELDING GAS SAVER DEVICE

(76) Inventor: Gerald Daniel Uttrachi, 4313 Byrnes Blvd., Florence, SC (US) 29506-8310

( * ) Notice: Subject to any disclaimer, the term of this patent is extended or adjusted under 35 U.S.C. 154(b) by 0 days.

(21) Appl. No.: 09/911,506

(22) Filed: Jul. 24, 2001

(65) Prior Publication Data

US 2003/0019845 A1 Jan. 30, 2003

(51) Int. Cl.$^7$ ................................................ B23K 9/173
(52) U.S. Cl. ........................................ 219/74; 219/137.9
(58) Field of Search ........................... 219/74, 75, 136, 219/137.9; 138/44, 45, 46, 37, 40, 118

(56) References Cited

U.S. PATENT DOCUMENTS

| | | | | |
|---|---|---|---|---|
| 1,928,992 A | * | 10/1933 | Clark et al. ................. | 138/103 |
| 3,275,796 A | * | 9/1966 | Bernard et al. ......... | 219/137.71 |
| 4,341,237 A | | 7/1982 | Stauffer ................... | 137/382.5 |
| 4,915,135 A | * | 4/1990 | Kellenbarger et al. ........ | 138/44 |
| 6,207,921 B1 | * | 3/2001 | Hanna ......................... | 219/74 |
| 6,390,134 B1 | * | 5/2002 | Hanby ......................... | 138/44 |

OTHER PUBLICATIONS

F–7045–A (L–TEC sales flyer; Gas Saver Regulator/Flowmeter; Jan. 15, 1987).*

F–7045–A Jan. 15, 1987, Sales Flyer, Gas Saver Reg./Flow meter.

The Fabricator Jun. 2000, Shielding Gas Consumption p. 29, Columns 3&4.

* cited by examiner

Primary Examiner—M. Alexandra Elve
Assistant Examiner—Kevin P. Kerns

(57) ABSTRACT

This device significantly reduces major reasons for shielding gas waste primarily in metal inert gas welding. Excess shielding gas stored at the end of each weld in the shielding gas delivery hose connecting the gas source to the welding machine creates a shielding gas flow-surge at the next weld start. This gas flow-surge creates shielding gas waste and can cause poor weld start performance. Other methods employed over the years to reduce shielding gas waste have been either complex, leaked, were not sufficiently robust for the environment, provided only partial solutions or did not provide shielding gas savings for welds longer than about 3 seconds. This device includes a delivery hose connecting the shielding gas supply to the welding machine, which has a small internal volume and a gas surge-restricting orifice at the gas solenoid end of the hose.

3 Claims, 2 Drawing Sheets

WELDING SHIELDING GAS SAVER DEVICE

BACKGROUND

1. Field of Invention

This invention relates to savingS of 50% or more of shielding gas primarily in the MIG welding process while improving weld start quality.

2. Description of Prior Art

Gas metal arc welding (GMAW) is commonly referred to as metal inert gas welding (MIG). The term MIG welding is used for the purposes of this invention. In the MIG welding process molten metal is produced by an electric arc. This molten metal is derived from the materials to be welded and a filler wire. The filler wire is fed into the arc zone by a feeding mechanism. The molten weld metal is protected from the surrounding air by a shielding gas. A suitable power source is connected between the workpiece to be welded and to the filler wire passing though a welding torch. Welding power, welding filler wire and shielding gas are usually transported through the torch. The welding torch is usually attached to a flexible cable assembly and is manipulated by the welding operator.

The shielding gas employed to protect the molten metal formed by the electric arc can be a number of gases such as argon, carbon dioxide, and helium Mixtures of these and small amounts of other gases are employed to provide the desired welding performance. This shielding gas is often supplied in high-pressure cylinders, one associated with each weld station. Fabricating shops with a large number of MIG welders may have the shielding gas distributed to each welding machine through a delivery pipeline from a centrally located gas source. A pressure-controlling regulator is employed to reduce the shielding gas pressure contained in the high-pressure cylinder or in the delivery pipeline to a lower pressure level. When an inert type gas or gas mixture is used it is common for this pressure to be reduced to a preset level or 25 psig (pounds per square inch above atmospheric pressure), 30 psig, or in some common regulators designed for shielding gas delivery service, 50 psig. The exact fixed output pressure level of the regulator is dependent on the manufacturer and model. For installations using carbon dioxide as a shielding gas supplied in cylinders, it is common to employ a regulator with 80 psig fixed output. This higher outlet pressure reduces the possible formation of ice crystals in the regulator/flow control system as the carbon dioxide gas pressure is reduced. A variable flow control valve or suitable flow control device is incorporated immediately after the regulator or is built into the regulator mechanism. This flow control device allows regulation of the shielding gas flow to the appropriate rate needed for welding. The flow control device may incorporate a flow measurement gauge.

It is also common for a flexible hose to be used to deliver the shielding gas from the cylinder or gas pipeline regulator and flow control device to the welding machine or wire-feeding device. It is most common for this hose to be ¼ inch in internal diameter. In some instances the hose may be ³⁄₁₆ inches in inside diameter. Some low current output welding machines, primarily designed for home use application, employ short lengths, usually less than 3 feet, of smaller diameter hose, small in internal and external diameter. To turn the flow of shielding gas on and off in commercial MIG welding systems, it is common to employ an electrically operated gas solenoid in the wire feeder or welding machine. A flexible hose connects the shielding gas supply to the solenoid at the welding machine. This hose is typically about 6 to 20 feet or longer in length to fit the needs of the welding installation. When welding is started, usually by means of an electrical switch on the welding torch, the gas solenoid is opened allowing shielding gas to flow through the welding torch to the weld zone. The electrical switch may simultaneously engage the wire feed mechanism and power source.

In most systems the flow of shielding gas is controlled by a flow control valve or other suitable flow control device at the regulator. The flow control device is adjusted to achieve the desired shielding gas flow. It is common for this flow to be set from 20 cubic feet per hour (CFH) to 40 CFH. Gas flows much in excess of this level can cause turbulence in the shielding gas stream as it exits the welding torch. This turbulence allows the surrounding air to be aspirated into the gas-shielding stream, degrading weld performance. In many systems, the pressure at the electrically operated gas solenoid needed to provide the proper flow of shielding gas is less than 5 to 10 psig. Therefore while welding is being performed, the pressure in the shielding gas delivery hose can be less than 5 to 10 psig.

While welding, the electric solenoid valve is open, and the gas pressure in the gas delivery hose is only that needed to establish the desired flow. The flow control device at the regulator is set for the desired shielding gas flow rate and indirectly establishes this pressure. This flow control device may incorporate a flow-measuring gauge to allow proper adjustment of shielding gas flow. Portable flow control gauges are also available. To use a portable gauge, it is put over the end of the torch, the wire feed mechanism is temporarily disengaged and the welding machine is activated with the torch held upward, away from the workpiece. The portable gauge is then used to set the proper shielding gas flow by adjusting the flow control device near the regulator. When the proper shielding gas flow is set and welding commences the pressure in the gas delivery hose near the solenoid is typically less than 5 to 10 psig depending on the torch type, length, and plumbing restrictions. When welding is stopped the solenoid closes and flow of shielding gas from the solenoid to the torch stops. However the gas flow continues to fill the gas delivery hose until the gas pressure in the hose reaches the pressure set by the regulator. The pressure in the gas delivery hose than rises from what was needed to establish the proper flow level to the outlet pressure of the regulator, typically 25 psig, 30 psig, 50 psig, or 80 psig as mentioned above. The excess pressure stores shielding gas in the gas delivery hose connecting the regulator/flow control device to the welding machine or wire feeder until the solenoid is opened again at the start of the next weld. Once the weld is restarted, this excess shielding gas is expelled very rapidly, usually within less than about ½ to 3 seconds. These shielding gas flow rates can momentarily reach in excess of 100 CFF, much higher than needed and also higher than desirable for good weld quality. Weld start quality can be impaired because of excess shielding gas flow creating air aspiration into the shielding gas stream. The wasted shielding gas, although small for each occurrence, can be very significant over time. Depending on the number of starts and stops versus the overall welding time, the wasted shielding gas can exceed 50% of the total gas usage. An article in the June 2000 Fabricator Magazine (referenced) sites the fact that most shops can reduce shielding gas consumption 50 to 80%. A significant waste is described as attributable to the excess storge of shielding gas in a commonly employed ¼ inch inside diameter shielding gas delivery hose.

There have been devices sold which provide solutions to this problem:

(a) One device designed to reduce shielding gas loss is described in U.S. Pat. No. 4,341,237. This device is of complex construction involving several mechanical elements to store and control this excess shielding gas. When properly functioning, this device does accomplish the objective of reducing shielding gas waste. However, it has a number of interconnected parts and must be inspected periodically to assure gas does not leak from the numerous internal connections creating gas waste.

(b) Another method occasionally used to reduce gas surge upon the initiation of the welding arc is to incorporate a flow control orifice at the solenoid end of the shielding gas delivery hose. This device is sometimes sold with the intent to reduce gas waste. The device can give the perception that gas waste is eliminated since the momentary high gas flow surge at the start of welding is reduced, however the gas waste may still occur. Another possible way to incorporate such an orifice restriction is defined in U.S. Pat. No. 4,915,135. The orifice size is selected to restrict gas flow. Depending on the delivery pressure of the regulator these devices employ very small orifices, as small as about 0.030 inches. A filter is often employed to avoid these small orifices becoming clogged by metal flakes or dirt in the gas stream emanating from the cylinder or pipeline. However these devices are usually set to control the gas flow rate well above that desired. This is necessary since differing welding torches, torch lengths and internal plumbing restrictions require differing pressures at the solenoid to obtain the desired gas flow through the torch. The actual pressure needed at the solenoid is indirectly set at the flow control device usually located at the regulator as mentioned above.

Orifice restriction devices help reduce high flow gas surge at the weld start and the resulting degradation of the weld but often do not eliminate or significantly reduce shielding gas waste. The orifice size selected is usually significantly larger than needed to control the shielding gas flow at minimum needed levels. When welding has started, after a period of several seconds the flow-control device at the regulator determines the gas flow rate and indirectly the pressure at the solenoid valve. When welding, gas pressure in the shielding gas delivery hose at the solenoid valve end reduces to that needed to obtain the desired flow, for example for some torches and systems, 5 psig. This is usually significantly lower than the regulator fixed output pressure. At the end of welding, the gas solenoid closes and the pressure in the shielding gas delivery hose increases to the delivery pressure of the regulator, i.e. 25, 30, 50, or 80 psig. Once welding commences the restriction orifice in most instances is not reducing shielding gas flow to the level established by the orifice. After several seconds, the flow rate reduces to the lower level set at the flow control device near or built into the regulator. Therefore, the pressure in the welding gas delivery hose near the solenoid end reduces to the level needed to achieve the desired flow, perhaps 5 psig. Experiments show, once the solenoid valve is open at the start of welding, even when a typical flow restriction orifice is used in the system, a majority of the excess gas stored in the shielding gas delivery hose passes through the torch in about 3 seconds or less. Therefore, if the weld occurs for more than about 3 seconds in time, a similar amount of excess shielding gas is lost as if the restriction orifice was not present. The loss takes longer to occur, perhaps about 3 seconds, but it occurs. In addition, if the orifice were sized to restrict flow to exactly that needed by the system to achieve the desired flow, there is no excess shielding gas at the start. It is desirable to have some extra shielding gas at the weld start to purge the torch system of air. Air will diffuse into the torch system down stream of the solenoid from the open end of the torch when welding is stopped.

(c) Another method of reducing shielding gas waste is by reducing the volume of shielding gas stored in the delivery hose. Assuming a given length hose is needed to achieve the desired welding machine configuration, the other dimension controlling the volume in the shielding gas delivery hose is the internal cross sectional area. A system was introduced commercially which used a small inside diameter shielding gas delivery hose to reduce volume (see L-TEC publication referenced). However, this small inside diameter shielding gas delivery hose, 0.125 inch ID, was also small on the outside having an external diameter of 0.21-inches. This hose had only a 0.043-inch wall thickness. This system did not perform in the industrial environment to which it is subjected and was withdrawn from sale. This ratio of ID to OD hose size is typical of what is commercially available for small ID hoses designed for the pressure ranges involved. A typical ¼-inch inside diameter shielding gas delivery hose has an outside diameter of about 0.40 inches. This provides a hose with a wall thickness of about 0.075 inches. The larger outside diameter and thicker wall hose is much more durable in typical welding fabrication service than the smaller outside diameter hose. Standard commercially available small inside diameter hoses do not have the needed outside diameter and wall thickness to provide crush and abrasion resistance needed for a welding environment. The small outside diameter hose can also create more hose tangles in normal system use. Some small home use MIG welders do employ a small inside as well as outside diameter hose to deliver shielding gas very short distances from a small cylinder to the welder. This distance is usually less than 3 feet. These hoses are approximately 0.18 inch outside diameter and are unacceptable, in an industrial environment.

SUMMARY, OBJECTS AND ADVANTAGES

It is the principle object of the present invention to provide a means of delivering shielding gas to a MIG welding machine from a shielding gas source such as a high pressure cylinder or gas pipeline which minimizes the storage of shielding gas when the system is stopped and avoids wasted shielding gas each time the system is energized. This system can be used on most industrial MIG welders to obtain significant savings in shielding gas usage. It can be readily added to an existing installation as well as incorporated into new products. The system is designed to be simple, rugged, reliable and require little or no maintenance in an industrial environment. Since a significant amount of shielding gas is saved, fewer cylinders require changing in a given work period where high-pressure cylinders are employed. The wasted time required to change cylinders is reduced and productivity of the welder increased. In addition to the gas savings, the gas flow surge at the start of welding is significantly reduced. This reduces the possibility of air aspiration in the shielding gas stream and resulting poor weld starts. Some additional shielding gas is still provided at the weld start to purge any air that will have backed into the end of the gas hose in the welding torch.

The shielding gas delivery hose in this invention shall have a small inside diameter to reduce shielding gas waste but be of sufficient outside diameter and robustness to be usable in a welding environment and incorporate a surge flow-restriction orifice or small diameter hose connection device located at the end closest to the gas solenoid.

DRAWING FIGURES

DESCRIPTION-MAIN EMBODIMENT

Figure 1:
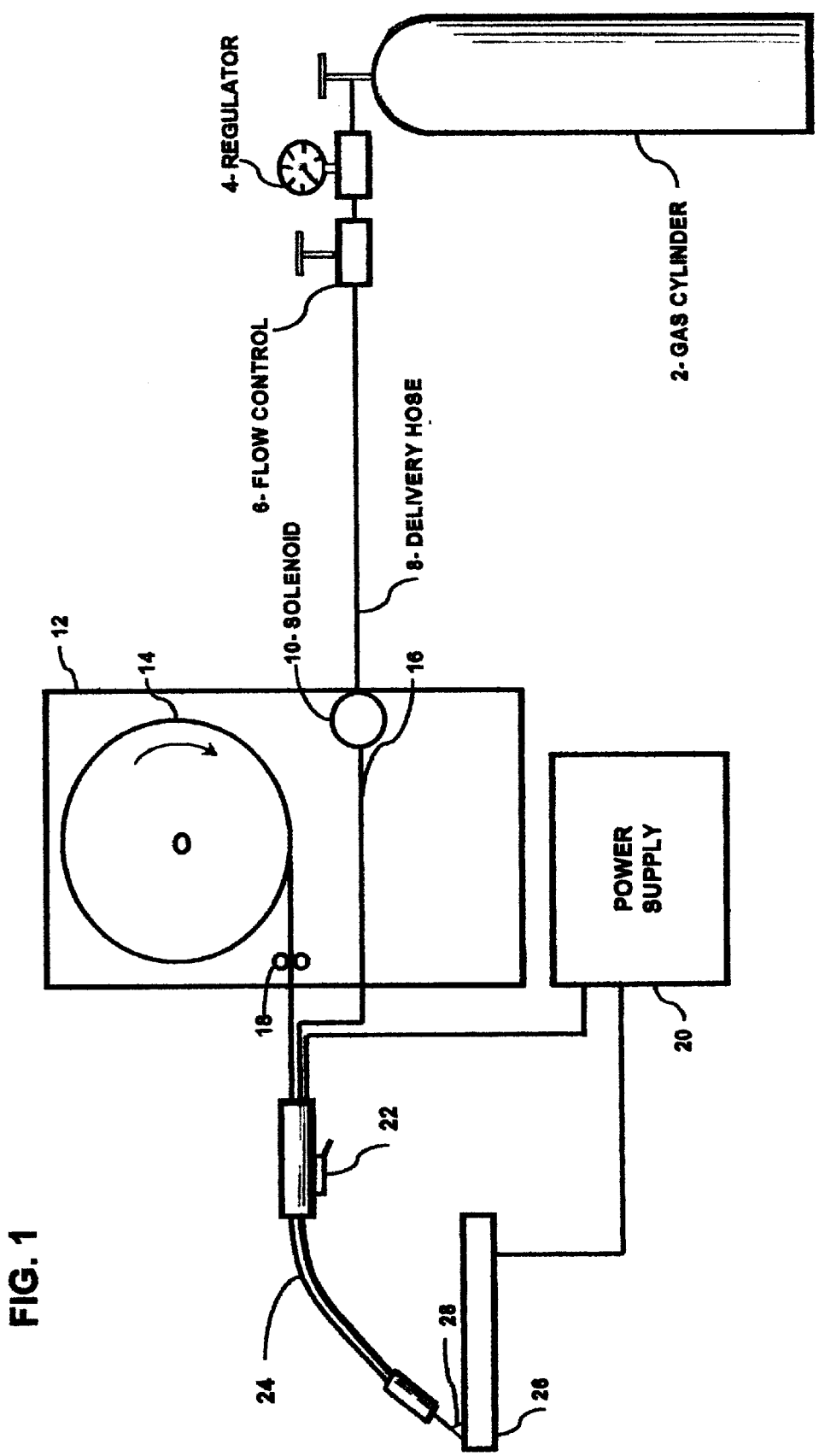
FIG. 1 is a schematic representation of a typical MIG welding system.

FIG. 1 illustrates a typical MIG welding system. Shielding gas is often supplied in a cylinder 2 or can be supplied in a pipeline. With either a cylinder or a pipeline supply of shielding gas, a regulator 4 is employed to lower the pressure for delivery to the welder. A flow control device 6, which may be incorporated in combination with the regulator 4 as a gas regulator/flow-metering device, controls the rate of shielding gas flow in the system. A flexible shielding gas delivery hose 8 is employed to convey the shielding gas from the gas source to the welding machine. The shielding gas delivery hose 8 is commonly connected to an electrically operated solenoid 10 used to control the gas flow off and on. This gas solenoid 10 is incorporated on or near the welding wirefeed system 12. A torch switch 22 is usually utilized to activate the gas solenoid 10, the wire feed mechanism 18, and the power source 20. This wire feed system may contain a wire spool 14 and a wire feed mechanism 18. The shielding gas is delivered from the solenoid 10 by means of a gas hose 16, to the welding torch 24. A welding power source 20 is employed to deliver the welding power. The power source may be integral with the wire feed system or separate. The welding power and welding wire are also feed to the welding torch 24. The shielding gas, welding wire and welding power come together at the tip of the torch 28 and the workpiece to be welded 26, to form an electric arc.

In this invention, the delivery hose 8 should be of specific dimensions to minimize shielding gas waste. As a preferred size, it should have an inside diameter of about 0.10 to about 0.15 inches. It should also have an outside diameter, or about 0.30 inches or larger to provide robust performance and avoid being pinched and shutting off the gas when stepped on. It should be at least about 3 feet in length to have sufficient gas saving benefit with a surge restricting orifice or small internal diameter hose connection fitting, located at the gas solenoid end of hose 8.

OPERATION-MAIN EMBODIMENT

Referring to FIG. 1. When welding is initiated, usually by closing the torch switch 22, the gas solenoid 10 is opened. Shielding gas flows from the cylinder 2, through the regulator 4, to flow control device 6, through the flexible shielding gas delivery hose 8, through the open solenoid 10, through the welding torch 24. The pressure in the shielding gas delivery hose 8 at the solenoid end is established by the restriction created by the flow control device 6 and the pressure drop in the hose and fittings caused by the flow of shielding gas. When welding is stopped, the solenoid 10 is closed; however shielding gas continues to flow into the gas delivery hose 8 until the pressure raises to the fixed output level of the regulator 4, which is commonly 25, 30, 50, or 80 psig. When welding is restarted, the excess gas pressure in the gas delivery hose 8 over that needed to produce the desired shielding gas flow rate is rapidly reduced to that governed by the flow control device 6. This produces a shielding gas flow rate in excess of that needed for the time it takes for the excess gas to leave the gas delivery hose 8. The majority of this excess shielding gas is wasted. A small amount of the extra gas is desirable to purge air quickly from the end of the torch system downstream of the solenoid that diffuses into those areas during the period when the weld was stopped. By employing a small internal diameter gas delivery hose and surge flow restricting orifice, the amount of excess shielding gas is controlled and losses are kept to a minimum. The volume of excess gas is reduced substantially from that normally encountered in systems with commonly used shielding gas delivery hose systems.

Figure 2:
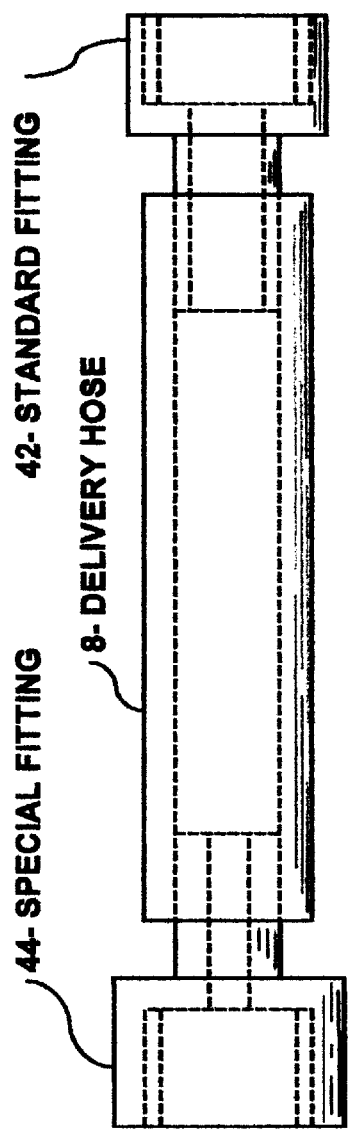
FIG. 2 is a schematic representation of a gas delivery hose connected to the welding system by a conventional connector on one side and a connector with a restricted internal passage on the other.

Referring to FIG. 2, a restricting orifice is employed at the gas solenoid end of the shielding gas delivery hose 8. This will further reduce gas surge at the weld start in addition to supplying the function of saving gas from the reduced internal volume of the gas delivery hose 8. This restricting orifice could be a separate device or be simply a controlled hole size in a fitting used to connect the gas savor, gas delivery hose 8 to the solenoid 10 in FIG. 1. Referring to FIG. 2, a standard fitting 42 having the appropriate thread or connecting means is used to attach the gas delivery hose 8 to a flow control device 6 in FIG. 1. A special fitting 44 in FIG. 2 having the appropriate threads or connecting means is used to connect the gas delivery hose 8 to the solenoid 10 in FIG. 1.

Figure 3:
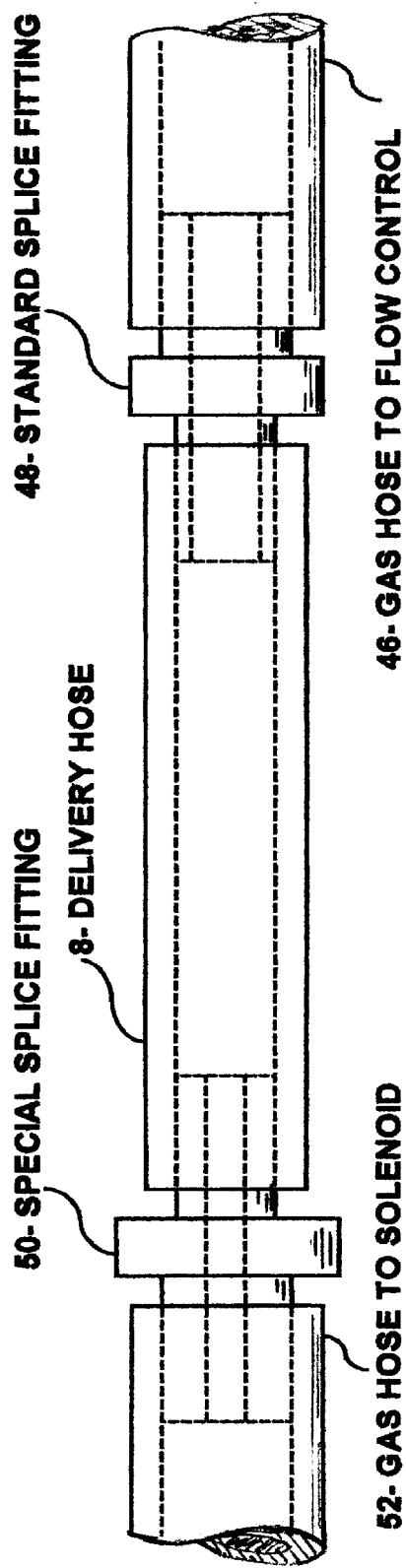
FIG. 3 is a schematic of a gas delivery hose connected to the welding system by a conventional hose splice to an existing gas delivery hoses which have been cut to a short lengths with one connector having a restricted internal passage.

It is also possible on existing installations to avoid the purchase of special threaded fittings and utilize hose splice connectors. A special hose splice connection with a restricted internal passage can be used to reduce gas flow surge at the weld start. The existing gas hose is cut, leaving only short ends attached to the flow control device and the solenoid. Referring to FIG. 3 a short length of hose to flow control 46 is put on one end of a hose splice connection 48. The short length hose to solenoid 52 is connected to a special hose splice fitting 50 which has a restricted internal passage. The gas delivery hose 8 is connected to the hose connection end on fittings 48 and 50.

Although the preferred embodiment incorporates a flexible shielding gas hose which is essentially round in shape with an essentially round ID it is possible to incorporate any shape as long as the volume of the internal dimension is about 0.1 to about 0.2 cubic inches per root of hose for the preferred system. This would include but not be limited to a hose, which consists of an annulus where the center is filled with any appropriate material such that the net resultant gas containment volume is about 0.1 to about 0.2 cubic inches per foot. It is understood this shielding gas savings device could be used for other welding applications such as Tungsten Inert Gas (TIG) welding. It is also understood a suitable filter could be incorporated prior to the restriction orifice to prevent clogging by debris.

CONCLUSION, RAMIFICATION, AND SCOPE

The shielding gas saving supply hose described in the invention reduces a major source of shielding gas waste in the MIG welding process. Once installed, it performs the gas saving function simply by employing a device with no moving parts and requiring no significant maintenance or interaction on the part of the welding operator. Installation is very simple and can be accomplished by replacing the existing hose and fittings with the new shielding gas saving, delivery hose and a surge flow restricting device or fittings. Alternately, for existing installations, the gas saver delivery hose can be spliced into the existing shortened ends of the original delivery hose using a surge flow-restricting fitting on the end closest to the gas solenoid while discarding most of that hose. Shielding gas waste can be decreased up to fourfold by the use of the system. For the MIG process the surge of shielding gas at the start of the weld is significantly reduced by the use of the reduced volume shielding gas delivery hose and the surge flow restriction device. This gas surge with commonly used gas delivery hoses has been measured in excess of 100 CFH. This gas flow rate can be reduced by more than 50% by employing the reduced volume, gas saving delivery hose and the surge flow restriction device. This reduced surge improves weld starts by eliminating air aspiration into the shielding gas stream. A small amount of gas surge remains at the start which provides some extra shielding gas to purge air that diffuses into the torch system downstream of the solenoid when welding is stopped.

I claim:

1. A metal inert gas weld system which incorporates a shielding gas delivery hose that transports shielding gas from a regulator and flow-control device attached to a high pressure cylinder or gas pipeline to a mechanism that incorporates a gas solenoid or similar off-on device and a welding torch; wherein said gas delivery hose:

a) is greater than about 3 feet in length, and b) has an internal diameter which ranges from about 0.10 to 0.15 inches, and c) has a surge flow-restricting orifice or small internal diameter hose connection device located at an end of said shielding gas delivery hose closest to said gas solenoid to limit shielding gas flow rate at weld initiation but not steady state flow.

2. The shielding gas delivery hose system of claim 1 wherein said shield gas delivery hose:

c) has a gas surge limiting flow-restricting orifice or small internal diameter hose connection device located at an end of said shielding gas delivery hose closest to the gas solenoid wherein said flow-restricting orifice is about 0.04 to 0.06 inches in diameter.

3. The shielding gas delivery hose system of claim 2 wherein said shielding gas delivery hose:

d) has an outside diameter greater than about 0.30 inches.

* * * * *